United States Patent
Schlipf et al.

(10) Patent No.: US 10,641,669 B2
(45) Date of Patent: May 5, 2020

(54) DEVICE AND METHOD FOR DETERMINING A CLOSING FORCE DURING THE CLOSURE OF A CAPSULE

(71) Applicant: Robert Bosch GmbH, Stuttgart (DE)

(72) Inventors: Jens Schlipf, Freiberg A.N. (DE); Andreas Braito, Urbach (DE); Walter Boehringer, Remshalden (DE); Werner Runft, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/099,884

(22) PCT Filed: Mar. 6, 2017

(86) PCT No.: PCT/EP2017/055123
§ 371 (c)(1),
(2) Date: Nov. 8, 2018

(87) PCT Pub. No.: WO2017/194220
PCT Pub. Date: Nov. 16, 2017

(65) Prior Publication Data
US 2019/0154529 A1   May 23, 2019

(30) Foreign Application Priority Data

May 9, 2016 (DE) ........................ 10 2016 207 923

(51) Int. Cl.
*G01L 5/00* (2006.01)
*G01M 99/00* (2011.01)
(Continued)

(52) U.S. Cl.
CPC .............. *G01L 5/0038* (2013.01); *G01L 1/00* (2013.01); *G01L 5/0076* (2013.01);
(Continued)

(58) Field of Classification Search
CPC . G01L 3/24; G01L 3/10; G01L 5/0076; G01L 5/0038; G01L 5/0042; G01L 5/108;
(Continued)

(56) References Cited

U.S. PATENT DOCUMENTS 4,964,262 A * 10/1990 Moser ...................... A61J 3/074
53/506
6,367,228 B1 * 4/2002 Wurst ...................... A61J 3/074
53/281
(Continued)

FOREIGN PATENT DOCUMENTS

DE   3830013    3/1990
DE   10001068   5/2001

OTHER PUBLICATIONS

International Search Report for Application No. PCT/EP2017/055123 dated May 23, 2017 (English Translation, 2 pages).

*Primary Examiner* — Lisa M Caputo
*Assistant Examiner* — Nigel H Plumb
(74) *Attorney, Agent, or Firm* — Michael Best & Friedrich LLP

(57) ABSTRACT

A device and a method for determining a closing force, the device including at least a lower part segment (45) for receiving at least one capsule lower part (15), at least one upper part segment (44) for receiving at least one capsule upper part (13), at least one closing means (47) that acts upon the capsule lower part (15) and/or the capsule upper part (13) for closure, wherein at least one force sensor (42, 46) is provided for absorbing a force (F) that acts upon the capsule (12) during closure.

21 Claims, 4 Drawing Sheets

(51) Int. Cl.
*G01L 1/00* (2006.01)
*A61J 3/07* (2006.01)
*B65B 57/04* (2006.01)

(52) U.S. Cl.
CPC ............. *G01M 99/00* (2013.01); *A61J 3/074* (2013.01); *B65B 57/04* (2013.01)

(58) Field of Classification Search
CPC ............ G01L 1/18; G01L 1/00; G01M 15/02; G01M 99/00; A61J 3/074; B65B 57/04; B65B 39/145; B65B 5/08; G01G 17/00
See application file for complete search history.

(56) References Cited

U.S. PATENT DOCUMENTS

| | | | | |
|---|---|---|---|---|
| 6,425,422 | B1* | 7/2002 | Trebbi | A61J 3/074 141/12 |
| 8,621,825 | B2* | 1/2014 | Schmied | A61J 3/074 53/244 |
| 8,794,273 | B2* | 8/2014 | Ansaloni | A61J 3/074 141/144 |
| 9,157,784 | B2* | 10/2015 | Trebbi | A61J 3/074 |
| 2001/0035431 | A1* | 11/2001 | Runft | A61J 3/074 222/168.5 |
| 2008/0230145 | A1* | 9/2008 | Schmied | A61J 3/074 141/71 |
| 2012/0207272 | A1* | 8/2012 | Runft | A61J 3/074 378/57 |

* cited by examiner

DEVICE AND METHOD FOR DETERMINING A CLOSING FORCE DURING THE CLOSURE OF A CAPSULE

BACKGROUND OF THE INVENTION

The present invention relates to a device and a method for determining a closing force during the closure of a capsule.

From DE 10001068 C1, a device for metering and dispensing powder into hard gelatin capsules or the like is already known. This device comprises a metering disk which revolves incrementally and in the bottom of which are configured bores which cooperate with compacting plungers that are movable up and down. The compacting plungers are arranged on a common compacting plunger carrier and, when plunged into the bores, press the powder into pellets. In order to be able to recognize fractures of springs and make a statement about the mass of the pellets, means which detect the spring travel of the compacting plungers arranged directly upstream of the ejection plungers are provided.

SUMMARY OF THE INVENTION

The object of the present invention is to further improve the prior art.

In relation to the above, the device according to the invention and the method according to the invention have the advantage that a detection of defective or damaged capsules during or directly after a closing operation is possible. Through an early recognition of a defectively closed capsule or a defective capsule per se, these can be removed from the process chain. As a result, machine malfunctions which can stem from damaged capsules are prevented. According to the invention, this becomes possible by virtue of the fact that at least one force sensor is provided to register a force which acts on the capsule during the closure.

In one expedient refinement, at least one evaluating unit, which detects the progression of the force, preferably as a function of a path length which is covered by the closing means, is provided. Specifically the relationship to the path length allows more precise conclusions to be drawn regarding the different causes of a fault. In this way, the meeting of two capsule halves can be recognized on the basis of the progression of the force.

In one expedient refinement, an evaluating unit, which compares the force with at least one limit value, in particular for the recognition of a defective or damaged capsule, is provided. If, for instance, the force is above a certain level prior to the snapping together of the two capsule halves, then the closing operation is defective and the capsule can subsequently be separated out.

In one expedient refinement, it is provided that at least one limit value is a function of a path length which is covered by the closing means. Account is here taken of the fact that the force changes also during a regular closing operation, so that, with an adjustment of the limit values, a more accurate determination of a defective capsule is possible.

In one expedient refinement, it is provided that the force sensor is arranged in at least one brace and/or in the closing means. In these preferred locations, the force pattern is able to be detected particularly easily. Particularly preferably, the force sensor is in this case such that it comes into contact with the top part of the capsule, in particular with the tip thereof.

In one expedient refinement, a properly formed capsule is then inferred if the force, in a lower path length range, in particular at the beginning of the closing operation, does not exceed a first limit value, and/or the force, in an upper path length range, in particular at the end of the closing operation, exceeds a further limit value. Specifically at the start of the closing operation, the capsule parts are slid one into the other without collision of the two capsule halves. Correspondingly, at the beginning, no significant force increase should thus be discernible in the event of a correct and proper closure. Only toward the end of the closing operation do the two capsule halves snap together, which results in an admissible force increase. This force increase must occur, however, since otherwise this necessary snapping in place has not taken place. This is likewise able to be monitored via an appropriate limit value, preferably toward the end of the closing operation.

In one expedient refinement, an upper limit value is chosen such that, if the force is exceeded, a defective or damaged capsule is inferred. A breaching of this suitably chosen upper limit would otherwise indicate, in particular, defective, indented capsules.

In one expedient refinement, as a function of the force, at least one ejection station is actuated for the ejection of at least one defective or damaged capsule. The gained information is thus able to be used for an automatic evacuation of defective capsules from the ongoing production process.

In one expedient refinement, at least one displacement transducer is provided to detect the path length. The path-length-dependent force pattern is thus able to be reliably determined.

BRIEF DESCRIPTION OF THE DRAWINGS

Illustrative embodiments of the device according to the invention are represented in the drawing and are described in greater detail below, wherein.

DETAILED DESCRIPTION

Figure 1:
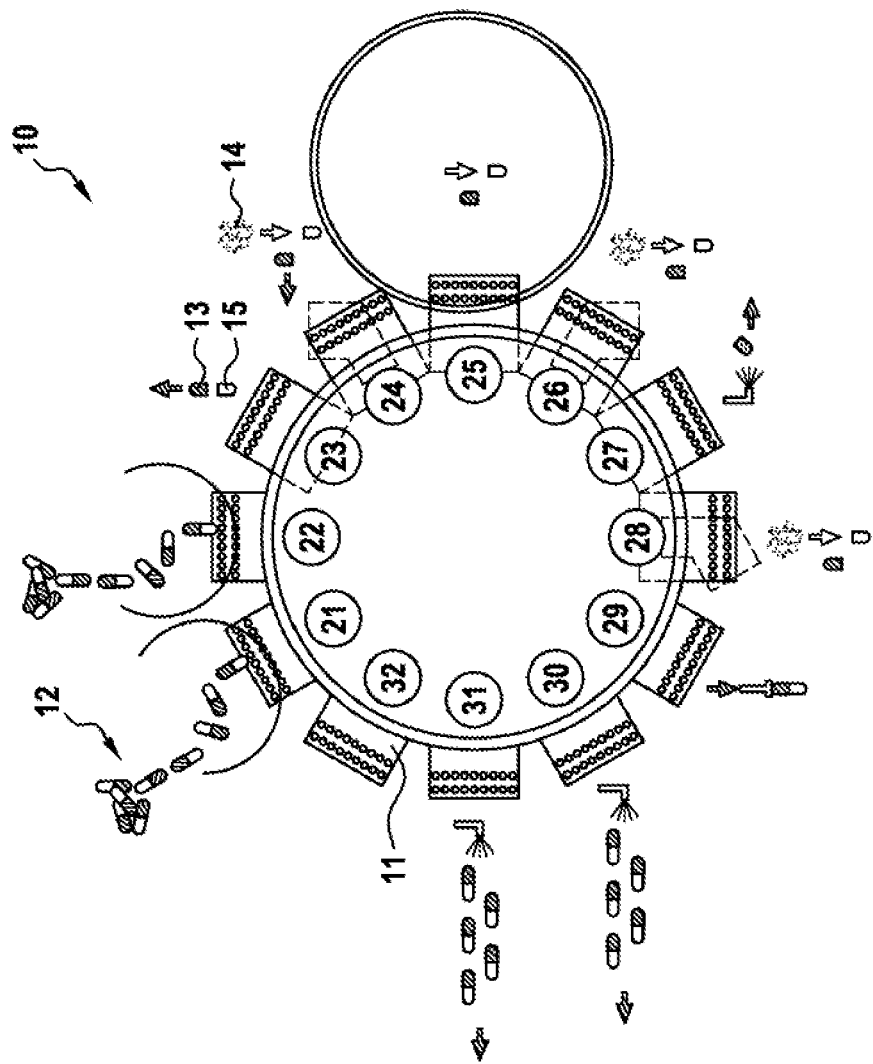
FIG. 1 shows a station overview of a device for filling and closing a capsule.

The illustrative embodiment according to FIG. 1 shows an overview of various stations of a device 10 for filling and closing capsules 12, preferably hard capsules, in particular hard gelatin capsules. A capsule holder 11 comprises various receptacles for capsules 12 in order to feed them to different work stations 21-32. The capsules 12, consisting of a capsule top part 13 and a capsule bottom part 15, are in at least one sorting station 21, 22, preferably two sorting stations, fed to the respective capsule holder 11. In a station 23 for sensing of the capsule top part, it is checked whether the capsules 12 fed to the capsule holder 11 are fully present. This station 23 can also be provided only as an option. The thus checked capsules 12 make their way, through rotation of the segmented wheel, to a filling station 24, preferably for so-called pellets. This filling station 24 can be optionally provided. In a filling station 25, filling material 14 is fed to the capsules 12. This is usually in the form of powdered medications which are introduced into the capsules 12. However, pellets or liquids as the filling material 14 can also be brought into the capsules 12. In conjunction, for instance, with a metering disk for the filling of powder or pellets, the capsule bottom parts 15 are filled with the desired fill quantity of filling material 14.D Different filling principles can herein be employed. Following on from this is a further filling station 26. This filling station 26 can be optionally provided, for instance for pellets. This is followed by a defective capsule station 27. In this station 27, non-separated capsules 12, falsely inserted capsules 12, or capsules 12 having a so-called double hat are discarded. Defective capsules 12 are thus expelled. There then follows a further filling station 28, for instance for pellets or tablets. This filling station 28 can be optionally provided. In a closing station 29, the filled capsule bottom parts 15 are closed with associated capsule top parts 13. In the closing station 29 is integrated a device 20 for determining a closing force, as further described below. As the next station there follows a capsule ejection unit 30. There, the filled and closed capsules 12 are ejected from the capsule holder 11 and fed to further processing steps. Here, via the device 20 for registering the closing force, recognized defective capsules 16 could be removed within the framework of this discard station. The next station too serves as a capsule ejection unit 31 in order to increase the output. In the discard stations 30, 31, the capsules 12 can be individually discarded or capsule holders 11 remain. A cleaning station 32 serves for the cleaning of the now empty capsules 12, or those still recognized as poor, in the capsule holder 11. The segmented wheel has now undergone a complete revolution, so that the capsule holder 11 is again available for the sorting station 21 or 22.

Figure 2:
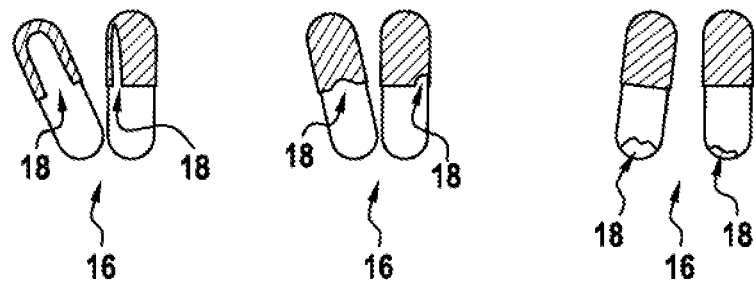
FIG. 2 shows a view of different defective capsules.

In FIG. 2, various damaged capsules 16 are shown. The damaged capsules 16 have different flaws 18. In this case, entire sections of the capsule top parts 13 can be missing, as shown in the left-hand pair. Or else flaws 18 are manifested in that the circumferential rim of the capsule top part 13 does not revolve in a straight line, as shown in the middle. In the represented view of the right-hand pair, the capsule bottom parts 15 have been indented, which is likewise regarded as a flaw 18.

Figure 3:
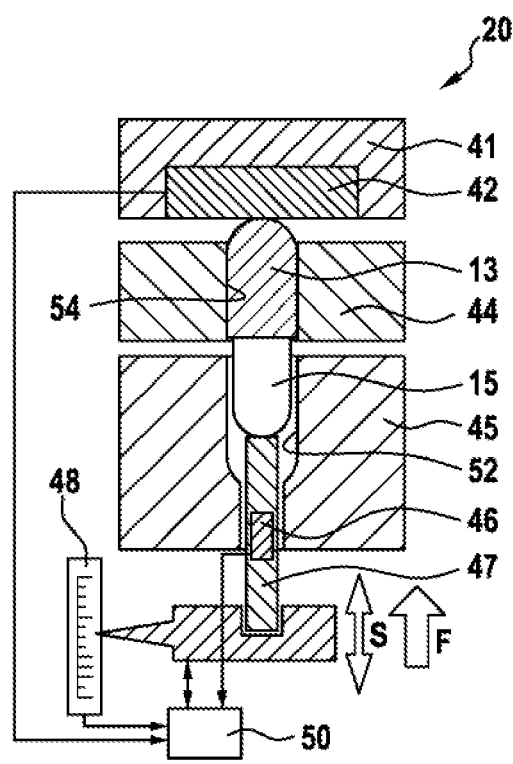
FIG. 3 shows a section through a device for determining a closing force.

The illustrative embodiment according to FIG. 3 shows a device 20 for determining a closing force during the closure of a capsule 12. This device 20 comprises at least one bottom part segment 45. This bottom part segment 45 preferably has an opening 52. This opening 52 serves to receive the capsule 12, in particular the capsule bottom part 15. Moreover, the opening 52 is continued downward in a taper, so that a pin 47 can be inserted through this opening 52, in particular for the closure of the capsule 12. The pin 47 is movably mounted. The pin 47 is herein configured such that it can act on the base of the capsule bottom part 15 for the purpose of closing the capsules 12. This can be done, on the one hand, by raising of the capsule bottom part 15 in the direction of a capsule top part 13. This capsule top part 13 stands ready in a top part segment 44. The top part segment 44 too has an opening 54 for receiving the capsule top part 13. The opening 54 is in this case shaped such that the capsule top part 13 can jut out over the top part segment 44. As a result, the tip of the capsule top part 13 can come into contact with a force sensor 42. The force sensor 42, in turn, is located in a brace 41. The brace 41 serves to ensure that the force sensor 42 is fixedly held and nor is it displaced by an upward pushing capsule 12. The force sensor 42 is preferably oriented perpendicular to the motional direction of the pin 47. As a result, it can register the force F which the capsule top part 13, during the closure, applies to the force sensor 42. The pin 47 is an example of a closing means. The closing means could also be configured as a ram or other moving part which applies a force to the capsule top part 13 and/or the capsule bottom part 15 for the purpose of closing the two capsule parts.

Figure 4:
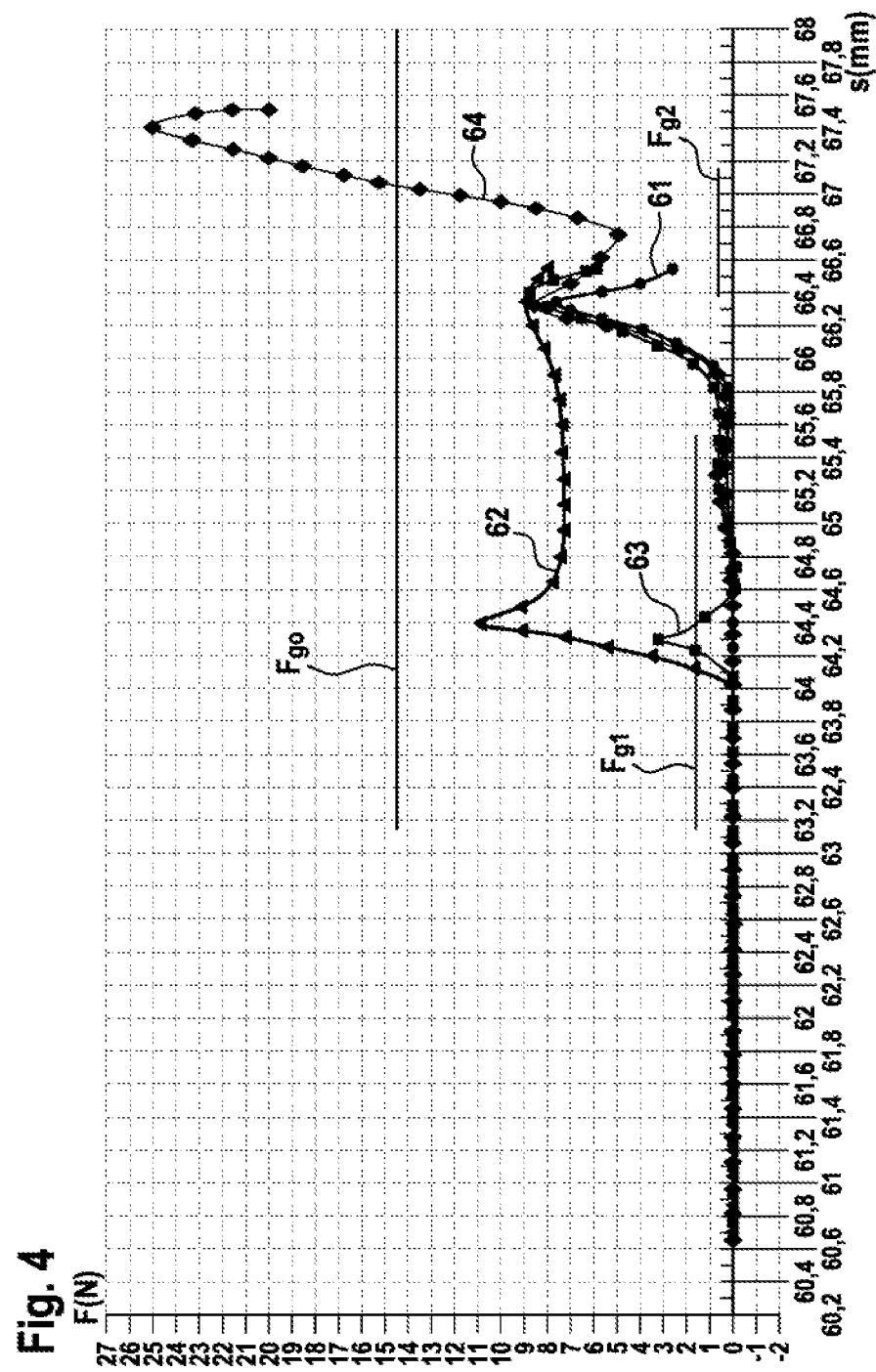
FIG. 4 shows a force pattern during a closing operation of capsules in a force-displacement diagram.

The device 20 herein works as follows. The pin 47 or the closing pin pushes the capsule bottom part 15, which is guided by the bottom part segment 45, into the capsule top part 13, which is guided by the top part segment 44. The capsule top part 13 here presses on the force sensor 42, which is received by the brace 41. Alternatively, a force sensor 46 can be inserted beneath the capsule 12 for recording purposes. During the upward movement of the pin 47, the lift of the pin 47, or the path length s and the closing force F which is necessary to close the capsule 12, are recorded. The travel or the path length s is recorded with a displacement transducer 48, and the force F is recorded with the force sensor 42 or the force sensor 46 arranged in the pin. The values are represented in a force displacement diagram, as in FIG. 4.

A first characteristic curve 61 shows the force pattern of the closing operation of a capsule 12 which has been properly closed. The capsule bottom part 15 is slid into the capsule top part 13 without the two capsule halves 13, 15 hereupon colliding. In the range between 66 mm and 66.6 mm, the correct and proper snapping together of the two capsule halves 13, 15 is recognized, which is accompanied by a rise in force and subsequent drop in force.

A second characteristic curve 62 shows the force pattern of the closing operation of a capsule 12 in which the capsule bottom part 15, when pushed upward, does not meet up with the capsule top part 13. The two capsule halves 13, 15 collide, whereupon one of the two capsule parts 13, 15 makes an incision, a so-called splice is formed. The collision is discernible at 64 mm, during the incision the force F remains at a raised level.

A third characteristic curve 63 shows the force pattern of the closing operation of a capsule 12 in which the capsule bottom part 15, when pushed upward, does not meet up with the capsule top part 13. The two capsule halves 13, 15 collide, the capsule bottom part 15 slides, despite collision, into the capsule top part 13. The collision is discernible at 64 mm, at 64.6 mm no force F is any longer discernible. Thus the capsule bottom part 15 does not make an incision. From 66 mm to 66.6 mm, the correct and proper snapping together of the two capsule halves 13, 15 is recognized. As a result of the collision, damage to the capsule 12 can arise.

A fourth characteristic curve 64 shows the force pattern of the closing operation of a capsule 12 in which either the capsule top part 13 or the capsule bottom part 15 has been indented. This becomes clear from the renewed and high force increase after the capsule top part 13 and the capsule bottom part 15 have been snapped in place.

Through the setting of suitable boundary conditions, damaged capsules 16 can be separated out. If a force F, prior to the snapping together of the two capsule halves, is above a certain first limit value Fg1, the closing operation is defective and the capsule can subsequently be separated out. This limit value Fg1 is preferably active at the beginning of the closing operation. This applies also to a generally defined upper limit Fgo. Via the upper limit Fgo, indented capsules 16, as represented in the right-hand pair of FIG. 2, are detected. Through the setting of a further limit value Fg2 at a relatively low force level, following the snapping together of the two capsule halves 13, 15 it is recognized whether a closing operation has taken place at all. If the force F over the course of the path length s, preferably toward the end of the closing operation, is above the further limit value Fg2, then a correct and proper closing operation has taken place, otherwise not.

The appropriate signal detection and signal evaluations can be conducted via an evaluating unit 50. In this case, the evaluating unit 50 determines the detected force F along the path length s which is detected via the displacement transducer 48. In the evaluating unit 50, appropriate limit values Fg1, Fg2, Fgo can be stored. These limit values Fg1, Fg2, Fgo can be chosen as a function of the path length s. In a correct and proper closing operation, the force F has, in a front path length range sv, must remain beneath the first limit value Fg1. For a rear path length range sh, the force F must exceed the further limit value Fg2. Over the full course of the path length sges, the force F must remain, however, beneath the upper limit value Fgo.

The evaluating unit 50 is preferably set up such that it drives a discard station, for instance the capsule ejection unit 30, 31, which ejects defective capsules 16 from the capsule holder 11 and removes these from the further production process or deliberately leaves them in place so that the defective capsule 16 can be removed at the cleaning station 31, 32. In parallel thereto, an appropriate recording of the force patterns F(s) is made as a function of the path length s. This can also be used for further statistical evaluations or linkage with information on an impending maintenance of the device 10 in the event of a spate of damaged capsules 16.

Figure 5:
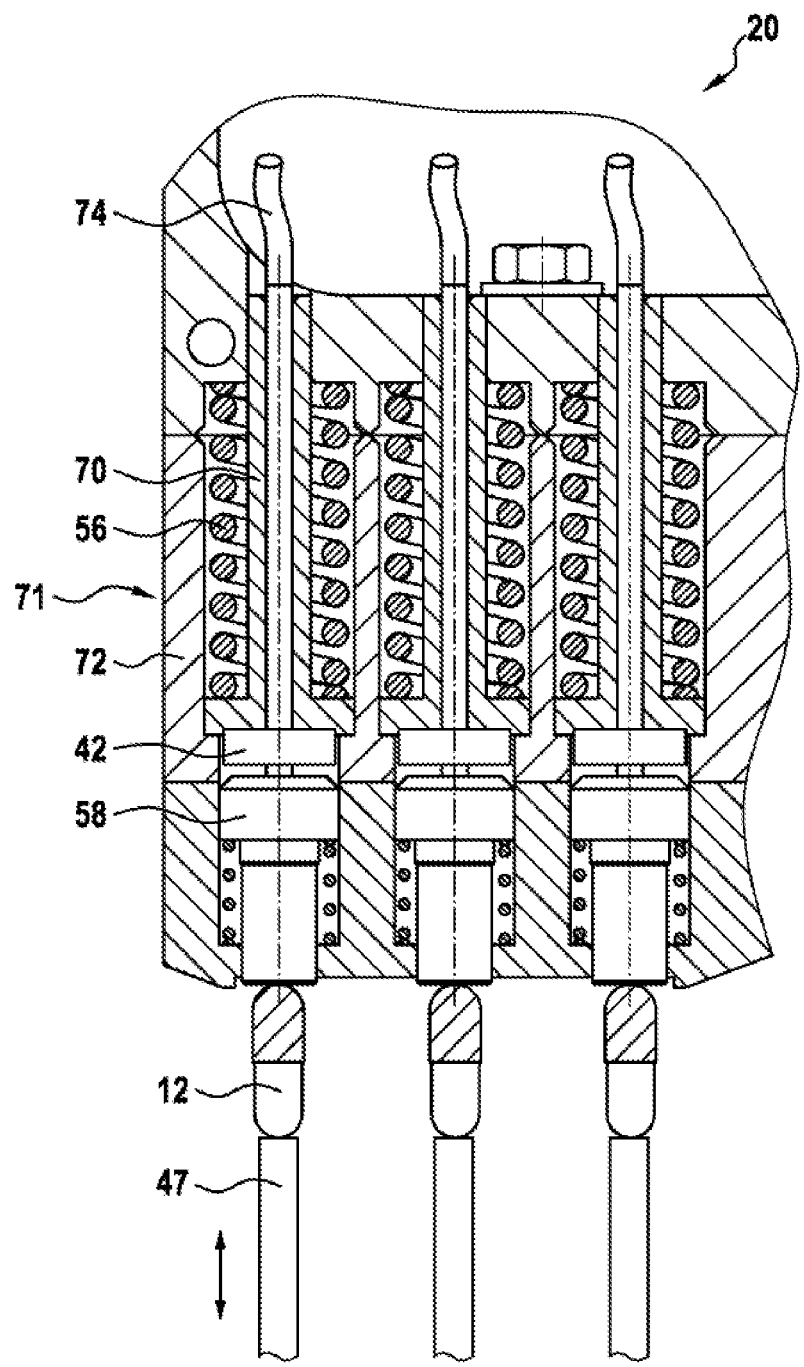
FIG. 5 shows an alternative illustrative embodiment of the device for determining a closing force, with overload protection.

The illustrative embodiment according to FIG. 5 is distinguished by an overload protection 71. The force sensor 42 is herein arranged on a moving part 70, which is connected via a spring 56 to a receptacle 72. As already described, the force sensor 42 registers the closing force F acting on the capsule 12. This is done via a pressure pin 58, the underside of which is acted on by the capsule top part 13. As already described, the capsule bottom part 15 is acted on by the closing pin 47.

In normal operation, the force sensor 42 does not move and registers the closing force F acting on the capsule 12, transmitted by the pressure pin 58. If, however, too large a force acts on the force sensor 42, the spring bias of the spring 56 is overcome and the moving part 70, with the thereto fastened force sensor 42, is pushed upward. The force sensor 42 can thereby be protected against over-large forces which could destroy it.

Inside the moving part 70, a cable 74 is run outward in order to feed the signals of the force sensor 42 to the evaluating unit 50. By way of example, three units, which respectively comprise a force sensor 42 and/or a pressure pin 58 and/or a closing pin 47, are provided. These are arranged parallel to one another and vary in number according to the design of the capsule holder 11.

The device and the method for determining a closing force are used in particular in packaging technology, in particular in connection with capsule filling machines.

The invention claimed is:

1. A device for determining a closing force (F) during closure of a capsule in order to detect a defective or damaged capsule (16), the device comprising at least one bottom part segment (45) for receiving at least one capsule bottom part (15), at least one top part segment (44) for receiving at least one capsule top part (13), at least one closing means (47), which, for the closure, exerts the closing force (F) on at least one of the capsule bottom part (15) and the capsule top part (13) to close the capsule (12), and at least one force sensor (42, 46) configured to register the closing force (F).

2. The device as claimed in claim 1, further comprising at least one evaluating unit (50), which detects a progression of the closing force (F).

3. The device as claimed in claim 1, further comprising at least one evaluating unit (50), which compares the closing force (F) with at least one limit value (Fg1, Fg2, Fgo).

4. The device as claimed in claim 3, characterized in that the at least one limit value (Fg1, Fg2, Fgo) is a function of a path length (s) which is covered by the closing means (47).

5. The device as claimed in claim 1, characterized in that the force sensor (42, 46) is arranged in at least one of a brace (41) and in the closing means (47).

6. The device as claimed in claim 1, characterized in that the force sensor (42) is arranged such that the force sensor comes into contact with the capsule top part (13) indirectly or directly.

7. The device as claimed in claim 1, characterized in that the device infers a properly formed capsule (12) if the closing force (F), in a lower path length range (su), does not exceed at least one of a first limit value (Fg1), and the closing force (F), in an upper path length range (so), exceeds a further limit value (Fg2).

8. The device as claimed in claim 1, characterized in that an upper limit value (Fgo) is chosen such that, if the closing force (F) exceeds the upper limit value, a defective or damaged capsule(16) is inferred.

9. The device as claimed in claim 1, characterized in that, as a function of the closing force (F), at least one ejection station is actuated for the ejection of at least one defective or damaged capsule (16).

10. The device as claimed in claim 1, further comprising at least one overload protection (71), which protects the force sensor (42).

11. The device as claimed in claim 1, further comprising at least one evaluating unit (50), which detects a progression of the closing force (F) as a function of a path length (s) which is covered by the closing means (47).

12. The device as claimed in claim 11, further comprising at least one displacement transducer (48) configured to detect the path length (s).

13. The device as claimed in claim 1, further comprising at least one evaluating unit (50), which compares the closing force (F) with at least one limit value (Fg1, Fg2, Fgo) for the recognition of a defective or damaged capsule (16).

14. The device as claimed in claim 1, characterized in that the force sensor (42) is arranged such that the force sensor comes into contact with a tip of the capsule top part (13), indirectly, via a pressure pin (58), or directly.

15. The device as claimed in claim 1, characterized in that the device infers a properly formed capsule (12) if the closing force (F), in a lower path length range (su) at the beginning of the closing operation, does not exceed at least one of a first limit value (Fg1), and the closing force (F), in an upper path length range (so) at the end of the closing operation, exceeds a further limit value (Fg2).

16. The device as claimed in claim 1, further comprising at least one overload protection (71), which protects the force sensor (42) in conjunction with a spring element (56).

17. A method for determining a closing force (F) of a capsule (12) in order to detect a defective or damaged capsule (16), wherein at least one bottom part segment (45) is registered, wherein at least one top part segment (44) is registered, wherein, for the closure, the closing force (F) is exerted on at least one of a capsule bottom part (15) and a capsule top part (13) to close the capsule (12), and wherein the closing force (F) is determined.

18. The method as claimed in claim 17, characterized in that the determined closing force (F) is compared with at least one limit value (Fg1, Fg2, Fgo).

19. The method as claimed in claim 18, characterized in that at least one limit value (Fg1, Fg2, Fgo) is a function of a path length (s) by which a closing means (47) is transported during the closure of the capsules (12).

20. The method as claimed in claim 17, characterized in that at least one overload protection (71) enables a movement of the force sensor (42) in the event of an overload.

21. The method as claimed in claim 17, characterized in that the determined force (F) is compared with at least one limit value (Fg1, Fg2, Fgo) for the recognition of a defective or damaged capsule (16).

* * * * *